No. 612,807. Patented Oct. 18, 1898.
R. H. POSTLETHWAITE.
WINCH.
(Application filed July 6, 1897.)
(No Model.) 3 Sheets—Sheet 1.
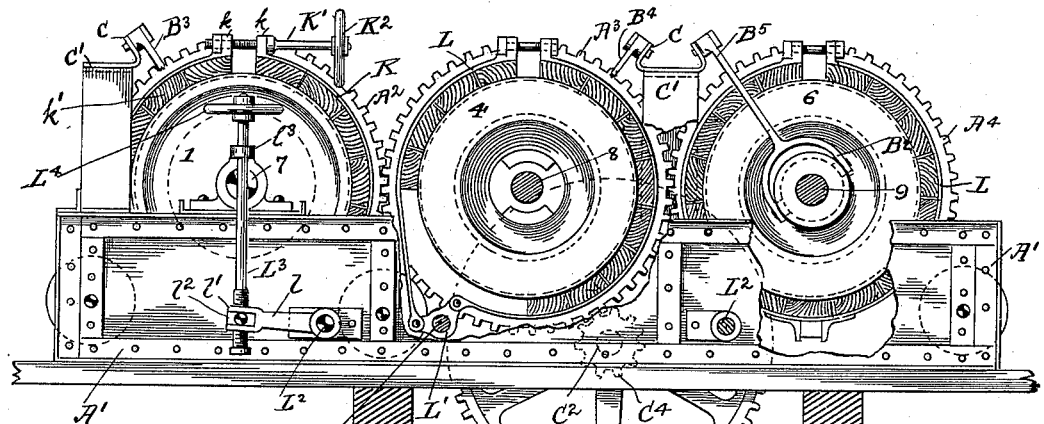
Fig. 1.
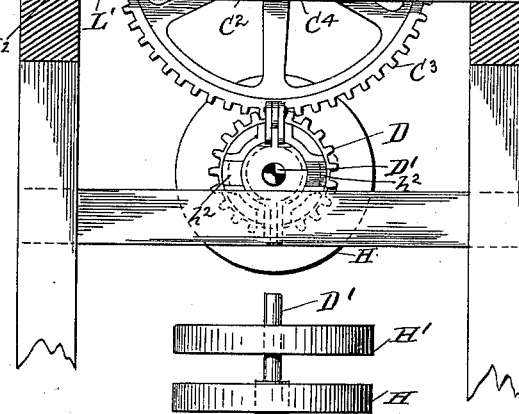
Fig. 2.
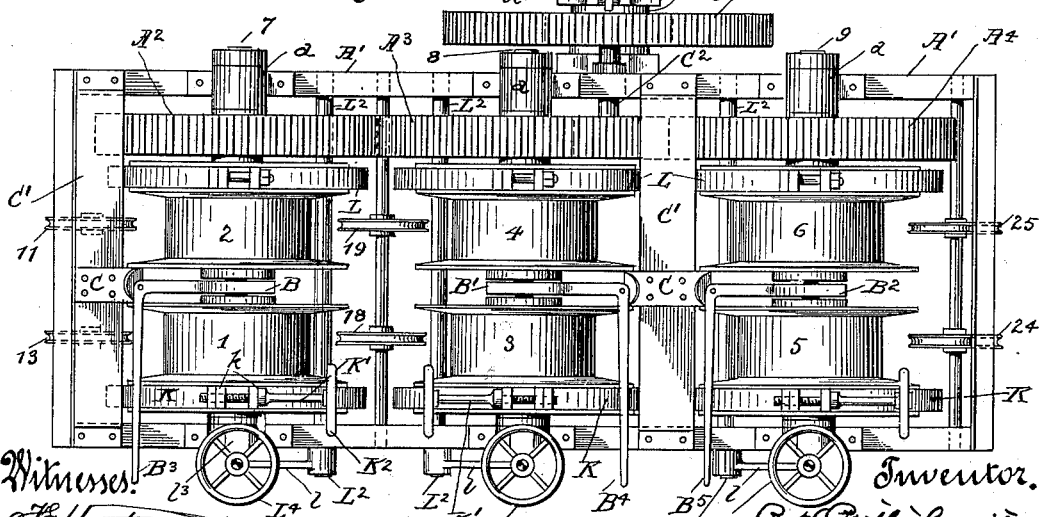
Witnesses: Inventor.
THE NORRIS PETERS CO., PHOTO-LITHO., WASHINGTON, D. C.

No. 612,807. Patented Oct. 18, 1898.
R. H. POSTLETHWAITE.
WINCH.
(Application filed July 6, 1897.)
(No Model.) 3 Sheets—Sheet 2.
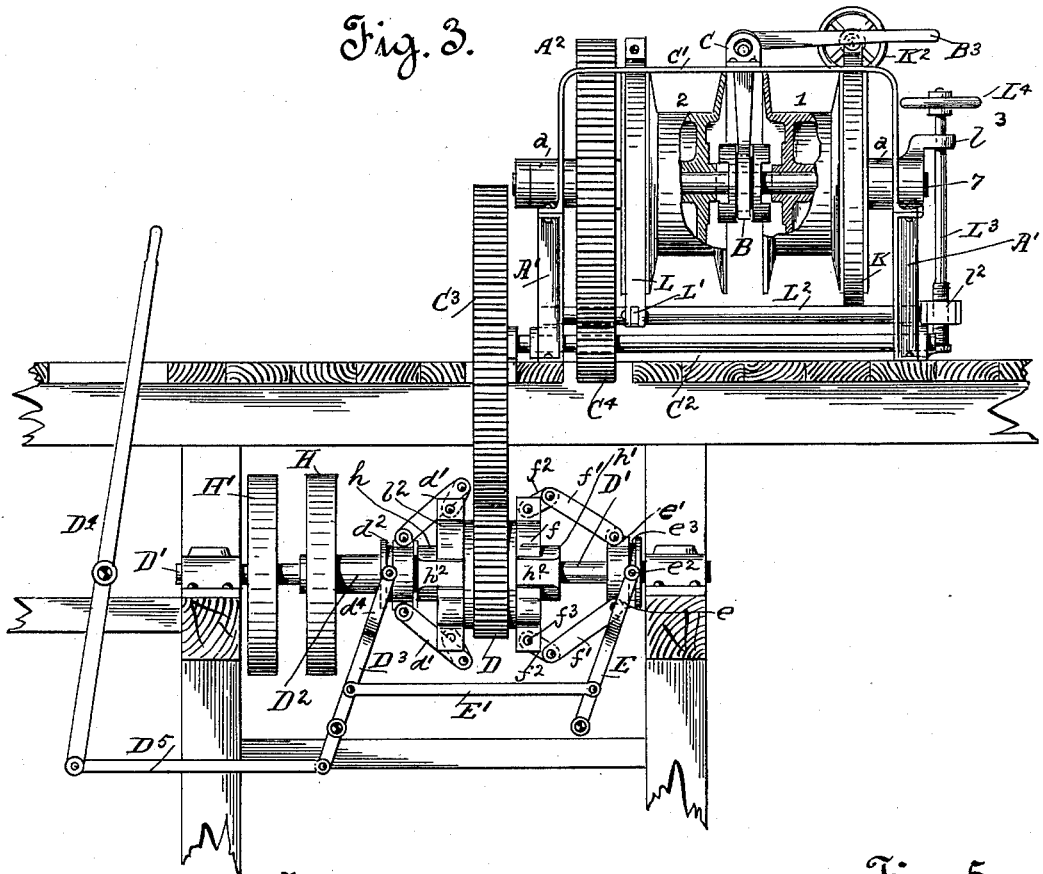
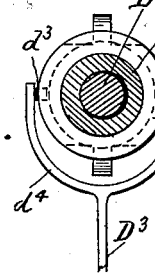

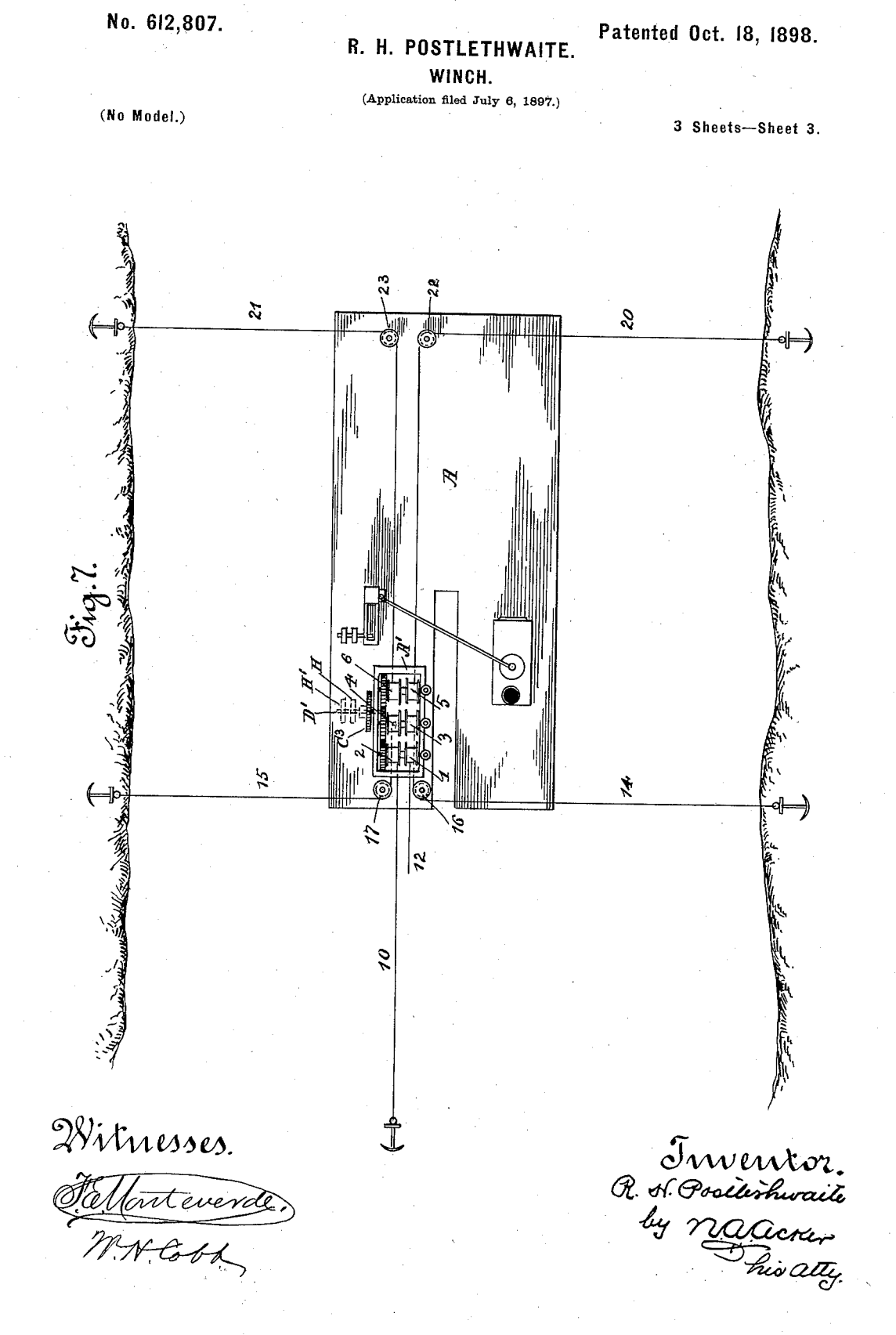

No. 612,807. Patented Oct. 18, 1898.
R. H. POSTLETHWAITE.
WINCH.
(Application filed July 6, 1897.)

(No Model.) 3 Sheets—Sheet 3.

Fig. 7.

Witnesses.
J. E. Monteverde.
W. H. Cobb.

Inventor.
R. H. Postlethwaite
by N. A. Acker
his atty.

UNITED STATES PATENT OFFICE.

ROBERT H. POSTLETHWAITE, OF SAN FRANCISCO, CALIFORNIA, ASSIGNOR TO THE RISDON IRON AND LOCOMOTIVE WORKS, OF SAME PLACE.

WINCH.

SPECIFICATION forming part of Letters Patent No. 612,807, dated October 18, 1898.

Application filed July 6, 1897. Serial No. 643,586. (No model.)

*To all whom it may concern:*

Be it known that I, ROBERT H. POSTLETHWAITE, a subject of the Queen of Great Britain, residing at San Francisco, in the county of San Francisco and State of California, have invented certain new and useful Improvements in Winches; and I do hereby declare that the following is a full, clear, and exact description thereof.

The present invention relates to certain new and useful improvements in winch mechanism for use in connection with hoisting or other machinery; and it consists in the arrangement of parts and details of construction as will be hereinafter fully set forth in the drawings and described and pointed out in the specification.

The invention is more especially designed for use in connection with that class of dredgers known as "gold" dredgers or those used for the recovery of the precious metal from the beds of rivers or other places; and it has for its main object the providing of a winch whereby a number of guy or anchor cables or ropes may be successfully handled at the same time in order to shift or change the position of the dredge-boat, as may be desired, without the use of spuds or similar devices, the winch being so constructed that all the winding-drums are under the control of a single operator. Consequently one or more of the anchor cables or ropes may be wound upon the drums at one time, dispensing with a number of men generally employed and obviating or saving the delay occasioned to the working of the dredge-boat by being moved about by drawing in and letting out of the guy or anchor ropes separately.

In order to understand the invention, reference must be had to the accompanying sheets of drawings, wherein—

Figure 1 is a side view in elevation, partly broken away, of the winch mechanism. Fig. 2 is a top plan view of the mechanism illustrated by Fig. 1. Fig. 3 is an end view in elevation. Fig. 4 is a detail sectional view of the driving-pinion and one of the frictional clutch mechanisms for imparting motion to the drums. Fig. 5 is a vertical sectional end view in elevation on line *x x*, Fig. 4. Fig. 6 is an end view in elevation, showing the slide-collar for throwing the clutch-bands in or out of frictional engagement with the pinion-hub and the lever for operating the slide-collar; and Fig. 7 is a plan view showing a dredge-boat with the winch mechanism thereon and the guy or anchor cables or ropes used in shifting the position of the dredge.

In the drawings the letter A is used to indicate any suitable dredge-boat, and A' a winch-frame, in the present case attached to the boat. This frame is an open one, constituted of any suitable material, and within the same are located, in the present case, six drums 1 2 3 4 5 6, which drums are arranged in pairs, so as to form two parallel lines. These drums are loosely mounted upon the cross-shafts 7 8 9, which work in suitable bearing-boxes *a*, secured to the side pieces of the frame A'. The forward drums 1 2 are mounted upon cross-shafts 7, drums 3 4 on the shaft 8, and drums 5 6 on shaft 9. The gear-wheels $A^2$, $A^3$, and $A^4$ are rigidly secured, respectively, upon one end of the cross-shafts 7 8 9, the middle gear-wheel $A^3$ being in mesh with the other two. Consequently as said gear is rotated the motion thereof is simultaneously transmitted to the gears $A^2$ and $A^4$.

By means of the slide clutch-collars B B' $B^2$, secured, respectively, upon the cross-shafts 7 8 9 between each pair of drums, the drums are thrown in or out of work. The slide clutch-collars are moved upon their respective shaft toward or from either drum by means of the crank-levers $B^3$ $B^4$ $B^5$, each lever being fulcrumed to brackets C, secured to and upwardly projecting from the cross-pieces C' of the frame A'. The lower end of each crank-lever is forked or bifurcated and fits within a central groove cut in each clutch-collar. By throwing the fulcrumed levers to the right or left the slide clutch-collars will be thrown into or out of engagement with the inner clutch-face of the respective drums. These slide clutch-collars are feathered upon the cross-shafts and revolve therewith. Consequently the motion of the shafts is transmitted at once to either of the drums the moment the clutch slide-collar is thrown into locked engagement therewith.

Motion is imparted to the several cross-shafts by the gear $A^3$, mounted upon the cross-shaft 8, meshing with the gears $A^2$ $A^4$, Fig. 2, said gear $A^3$ being driven by the pinion $C^4$, mounted upon the cross-shaft $C^2$, which meshes therewith. To one end of the cross-shaft $C^2$ is secured the large gear-wheel $C^3$, which has motion imparted thereto from the drive-pinion D, meshing therewith, which pinion is loosely mounted upon the drive-shaft $D'$. The drive-pinion is provided with the hubs $b$ $b'$, which are frictionally engaged by the friction-clamp bands. With the hub $b$ engage the clamp-bands $b^2$, which are united by the right and left screw-threaded bolts $b^3$. To these bolts are connected by links $d$ the levers $d'$, the outer end of which levers are connected to the slide-collar $d^2$, loosely mounted upon the sleeve $D^2$, mounted upon the drive-shaft $D'$. The slide-collar $d^2$ has a circular groove formed therein, within which fit the lugs $d^3$, inwardly projecting from curved arms $d^4$ of the fulcrumed lever $D^3$. This fulcrumed lever is connected at its lower end to the lower end of the fulcrumed hand-lever $D^4$ by the connecting-rod $D^5$. The said lever $D^3$ is also connected to a fulcrumed lever E by connecting-rod $E'$. The upper end of the fulcrumed lever E is provided with curved arms $e$, similar to lever $D^3$, which straddle the slide-collar $e'$, the pins or lugs $e^2$ projecting from said arms fitting within a circular groove $e^3$, formed in the said slide-collar. This collar is loosely mounted upon the drive-shaft $D'$ and the same is connected to the clamp-bands $f$, surrounding the hub $b'$, similar to the bands $b^2$, by means of the levers $f'$ and links $f^2$. These clamp-bands are united by the right and left hand screw-threaded bolts $f^3$, with which bolts the links $f^2$ connect. Between the slide-collars $d^2$ $e'$ and the clamp-bands $b^2$ and $f$, respectively, are placed the collars $h$ $h'$, feathered or keyed to the sleeve $D^2$ and shaft $D'$. These collars are provided with outwardly-extending arms $h^2$, which fit within notches $h^3$, cut in the said clamp-bands.

To the sleeve $D^2$ is secured the belt-wheel H, and to the drive-shaft $D'$ the belt-wheel $H'$, which wheels are driven by suitable belts. (Not shown.) One belt should be crossed, so as to impart opposite rotation to the wheels H $H'$. In this manner I am also able to reverse the movement of the drums, for as the clamped bands $b^2$ and $f$ are thrown into frictional engagement, respectively, with the hubs $b$ $b'$ of the drive-pinion D the said drive-pinion will have an opposite rotation imparted thereto. As the slide-collars $d^2$ $e'$ are moved toward or from the hubs of the drive-pinion by the inward or outward throw of the fulcrumed hand-lever $D^4$ the links $d$ $f^2$ will be thrown up or down. As said links are moved the screw-bolts $d^3$ $f^3$ will be turned to tighten or loosen the clamp-band $b^2$ $f$ upon the hubs of the drive-pinion.

The drums 1, 3, and 5 are provided each with a band-brake K, which band-brake is tightened or loosened by screwing in or out the screw-rod $K'$. This screw-rod works through the ears $k$, upwardly projecting from the ends of the brake-band, and the same is operated by means of the hand-wheel $K^2$. As the brake-band is drawn together the wooden shoes or blocks $k'$ are forced against the periphery of the said drum or drums. The drums 2, 4, and 6 are provided with similar band-brakes L, the ends of which are connected to the arms of the bell-crank lever $L'$, secured upon one end of the rock-shaft $L^2$. To the opposite end of said shaft a crank-arm $l$ is secured, the free end of which is slotted or bifurcated, (shown at $l'$,) and between the arms thereof is journaled the block $l^2$. Through this block is formed a vertical screw-threaded opening within which works the lower screw-threaded end of the rod $L^3$. This rod extends through guide-bracket $l^3$, projecting from the frame $A'$, and has secured to its upper end a hand-wheel $L^4$, by means of which the said rod is turned to raise or lower the crank-arm $l$. As this arm is raised or lowered the rock-shaft $L^2$ is turned to throw the bell-crank lever $L'$, so as to loosen or tighten the brake-band. It will be understood that each drum is provided with independent brake mechanism.

The anchor or guy cable or rope 10 passes over guide-sheave 11 and winds upon drum 2. Cable 12 passes over guide-sheave 13 and winds upon drum 1. Cables 14 and 15 pass over sheaves 16 17 18 19 and wind upon drums 3 and 4, respectively, while cables 20 21 run over guide-sheaves 22, 23, 24, and 25 and wind upon drums 5 and 6, respectively, Figs. 2 and 7.

By the foregoing-described winch mechanism the operator may wind upon three of the drums at a time, thus controlling three distinct cables or anchor-ropes and at the same time play off three of the cable or anchor ropes. Drums Nos. 2 3 5 may be operated at the same time or drums 1 4 5 or 5 4 2 or 6 3 1 or 2 4 6, &c., the only limitation being that two drums upon the same shaft cannot be operated at once. All the drums are driven from a common drive mechanism and the series of drums may be increased or decreased at will. It is not necessary that two or more drums be operated at one time, for the operator need only operate one, if desired, the remaining drums being held locked.

It will thus be observed that one operator is enabled to control the working of a number of drums at the same time, which when the mechanism is used in connection with dredgers creates considerable saving in the expense ordinarily attached to the working of a series of drums.

Having thus described my invention, what I claim as new, and desire to secure protection in by Letters Patent, is—

1. The combination with a series of drum-shafts, of a plurality of drums on each drum-shaft, means for placing either of said drums in or out of locked engagement with its respective shaft, intermeshing gears one on each drum-shaft for simultaneously driving the same, a pinion meshing with one of said gears, a gear $C^3$ on the shaft carrying said pinion, a drive connection for said gear $C^3$, a clutch mechanism for said drive connection, and means for operating said clutch mechanism to place it in or out of operative relation with said drive connection.

2. The combination with a series of drum-shafts, of a plurality of drums on each shaft, means for placing either of said drums in or out of locked engagement with its respective shaft, a train of gears for simultaneously driving said drum-shafts, a drive-shaft $D'$, a drive connection between said shaft $D'$ and one of the gears in said train, a sleeve on said drive-shaft $D'$, a belt-wheel on said shaft $D'$, a belt-wheel on said sleeve, a clutch mechanism for locking said drive connection to said shaft $D'$, a clutch mechanism for locking said drive connection to said sleeve, and operating means for said clutch mechanisms adapted to lock one of said clutch mechanisms and to unlock the other from said drive connection, substantially as and for the purpose set forth.

3. The combination with a series of drum-shafts, of one or more drums mounted upon each of the shafts, devices for placing the drums in or out of locked engagement with their respective shafts, brake devices for the drums, a train of gears connected to the shafts so as to simultaneously drive the same, a pinion meshing with one of the gears of the train, a gear-wheel mounted upon the shaft with the pinion, a drive-pinion meshing with the said gear-wheel, friction-clutch mechanism for engaging the hubs of the drive-pinion, drive-shaft upon which the pinion is mounted, and of devices for forcing the friction-clutch mechanism in or out of locked engagement with the hubs of the drive-pinion.

In testimony whereof I affix my signature, in presence of two witnesses, this 19th day of June, 1897.

ROBERT H. POSTLETHWAITE.

Witnesses:
N. A. ACKER,
LEE D. CRAIG.